Sept. 24, 1929.   C. B. NELSON   1,729,398
GAS SAVER
Filed Sept. 22, 1926
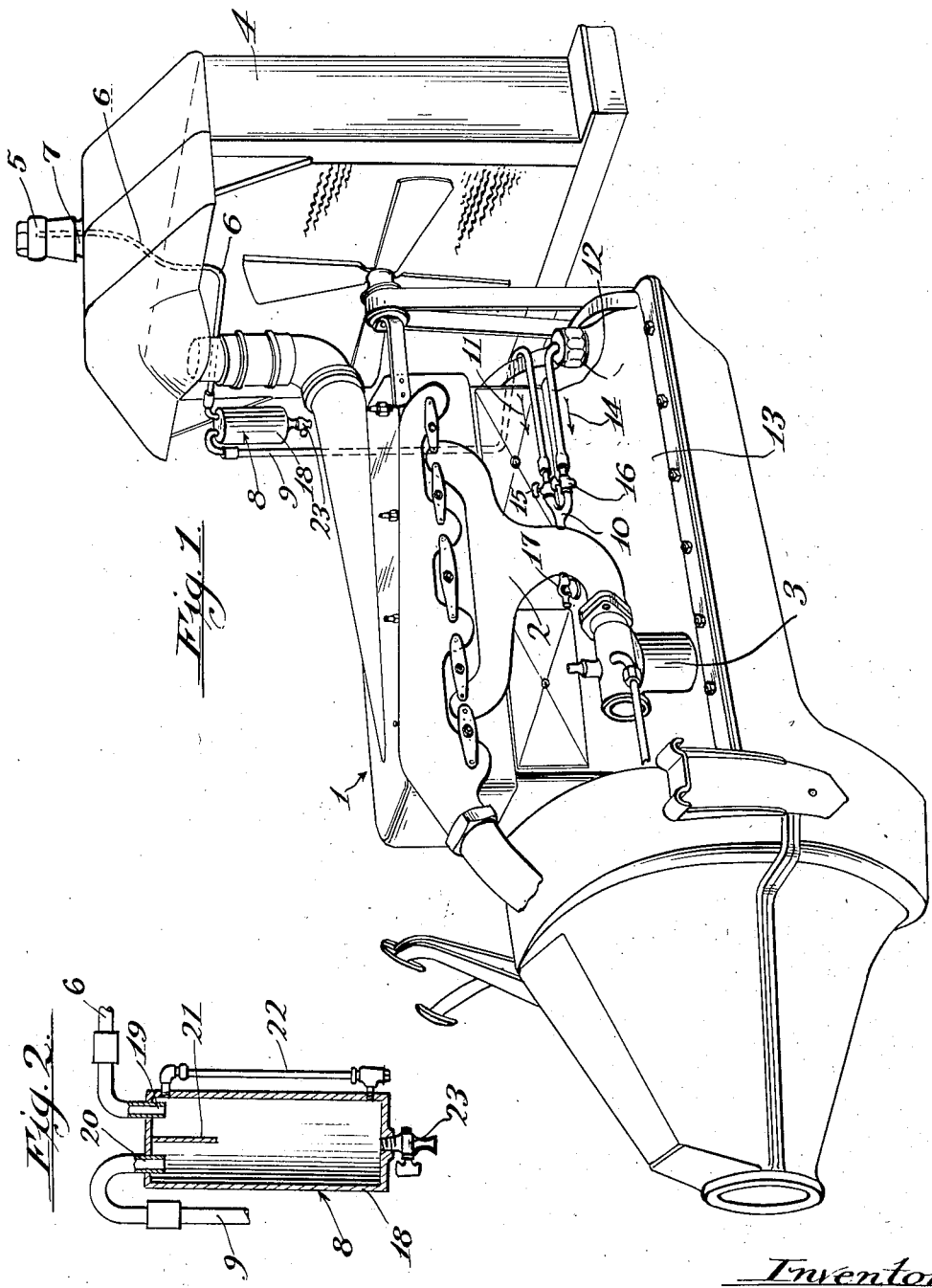
Inventor
Carl Berndt Nelson Patented Sept. 24, 1929

1,729,398

UNITED STATES PATENT OFFICE

CARL BERNDT NELSON, OF SAN PEDRO, CALIFORNIA

GAS SAVER

Application filed September 22, 1926. Serial No. 137,073.

My invention is a gas or gasoline saver for internal combustion engines, and being adapted principally for use with water cooled engines and preferably in connection with a radiator of an automobile or similar type of engine.

An object of my invention is to introduce water vapors into the intake gasoline supply after the gasoline has been vaporized in the carburetor, to also draw the oil vapors from the crank case into the gasoline intake and also air, these preferably being introduced into the intake manifold of an internal combustion engine.

Another object of my invention is to control the flow of the water vapor and the oil vapors and also the air by suitable valves.

A further feature of my invention is utilizing a trap to prevent any free water from entering the intake manifold.

My invention is illustrated in the accompanying drawings, in which;

Figure 1 is a perspective view of an engine with my installation for drawing water vapors from the radiator and oil vapors from the crank case, as well as sucking air into the intake manifold in the operation of the engine;

Fig. 2 is a sectional elevation of a water trap to trap any water which overflows from the radiator.

In the drawings the engine is designated generally by the numeral 1 having a gas intake pipe 2 connected to a carburetor 3, such carburetor being operated in the usual manner. The water radiator 4 is connected to the engine in the ordinary manner and has the usual type of valve cap 5. This cap should preferably form an airtight closure with the radiator.

An overflow pipe 6 is connected into the radiator and extends up into the filling tube 7, this pipe leading to the water trap designated generally by the numeral 8 which is constructed as hereunder set forth.

The outlet pipe 9 from the trap leads to a Y connection 10, the water vapors flowing in the direction of the arrow 11. An oil vapor pipe 12 is connected to the crank case 13 above the level of the oil therein, such pipe being also connected to the Y 10 and the oil vapor flowing in the direction of the arrow 14. A control valve 15 is connected to the water vapor pipe and a control valve 16 to the oil vapor pipe before same enters the Y.

The air intake to the manifold is through the valve 17 connected thereto. I find it desirable to have the intake of the vapors of water and oil flow into the intake manifold directly opposite the inflow of air. It is intended when the valves 15, 16 and 17 are properly adjusted that they are left in such adjustment and are not manipulated according to different engine speeds or engine carburetors.

The construction of the water trap 8 is substantially as follows:

This comprises a receptacle 18, the overflow pipe 6 extending slightly downwardly in the top as indicated by the numeral 19 and the outlet pipe 9 also extending partly through the top as indicated by the numeral 20. A baffle 21 is placed between these inlet and outlet pipes. A water gauge glass 22 is secured to the receptacle so that the water level may be easily read and a drain cock 23 is provided at the base of the receptacle.

The manner of operation of my gas saver is substantially as follows:

It will be understood that the carburetor is adjusted to properly gasify the gasoline and supply sufficient air for such gasification. Additional air for the combustion of gases and the oil vapor is provided by the valve 17. When the engine is operated and the water in the radiator becomes heated it develops a certain amount of water vapor and sometimes a considerable amount of steam which collects in the upper part of the radiator and in the filling tube 10. The suction of the engine draws the water vapors and the steam through the pipe 6 into the trap 8 and from the trap 8 through the pipe 9, valve 15 and the Y 10 into the intake manifold. Should the water in the radiator expand and overflow, passing down the overflow pipe 6, such water will be collected in the trap 8 and may be drawn off to the drain cock 23. This trap may be made of sufficient size to take care of any expansion of water when heated and prevent free water from passing into the intake manifold.

Due to the suction of the engine, the oil vapors developed in the crank case are sucked through the pipe 12, the valve 16, the Y 10 and into the intake manifold. Air is also sucked in through the valve 17.

Thus the cylinders and the engine are charged with the gasified gasoline with its proportionate mixture of air with the water vapors, which in the manifold would probably be in the form of steam and with the oil vapors from the crank case as well as having an additional supply of air through the valve 17. By having the water and oil vapor inlets directly opposite the air inlet to the valve 17, these additional charges appear to become intimately mixed. The explosion of the gasoline or gas causes the explosion or burning of the oil vapors and the generation of the steam from the water vapors, this giving an expansion medium which functions well in an internal combustion engine and results in considerable economy in the amount of gasoline used.

While the use of water vapors in the intake to an internal combustion engine and the use of auxiliary air intakes is old, my arrangement of having a combination of the water, the oil vapor and the auxiliary or additional air gives an improvement in the operation of the internal combustion engine.

It is obvious that the various features comprising my invention may be changed materially structurally from that illustrated in the drawings and described herein, but such changes whether in the general construction or specific details would be within the spirit of my invention as set forth in the description, drawings and claim.

Having described my invention, what I claim is:

In combination with an internal combustion engine having an intake manifold and a radiator, an overflow pipe connected to the radiator, a water trap having a baffle extending downwardly from the top, the overflow pipe being connected to the trap on one side of the baffle, an outlet pipe from the trap on the opposite side of the baffle, means to drain the trap, means to indicate the liquid level therein, a Y connection to the intake manifold, a valved vapor pipe connected to one branch of the Y and connected to the outlet of the trap, a valved oil vapor pipe connected to the other branch of the Y and to the crank case.

In testimony whereof I have signed my name to this specification.

CARL BERNDT NELSON.